(12) United States Patent
Guillanton et al.

(10) Patent No.: US 9,054,459 B2
(45) Date of Patent: Jun. 9, 2015

(54) ELECTRICAL CONNECTOR ASSEMBLY WITH A CPA ELEMENT

(75) Inventors: Erwan Guillanton, Maintenon (FR); Melanie Guillanton, Maintenon (FR)

(73) Assignee: Delphi International Operations Luxembourg SARL (LU)

( * ) Notice: Subject to any disclaimer, the term of this patent is extended or adjusted under 35 U.S.C. 154(b) by 35 days.

(21) Appl. No.: 14/114,787

(22) PCT Filed: May 14, 2012

(86) PCT No.: PCT/EP2012/058943
§ 371 (c)(1),
(2), (4) Date: Oct. 30, 2013

(87) PCT Pub. No.: WO2012/156373
PCT Pub. Date: Nov. 22, 2012

(65) Prior Publication Data
US 2014/0065857 A1  Mar. 6, 2014

(30) Foreign Application Priority Data

May 14, 2012 (WO) ................. PCT/EP2012/058943

(51) Int. Cl.
| H01R 3/00 | (2006.01) |
| H01R 13/642 | (2006.01) |
| H01R 13/52 | (2006.01) |
| H01R 13/641 | (2006.01) |
| H01R 13/70 | (2006.01) |
| B60L 11/18 | (2006.01) |
| H01R 13/629 | (2006.01) |

(52) U.S. Cl.
CPC .......... *H01R 13/642* (2013.01); *H01R 13/5202* (2013.01); *H01R 13/629* (2013.01); *H01R 13/641* (2013.01); *H01R 13/701* (2013.01); *H01R 2201/26* (2013.01);

(Continued)

(58) Field of Classification Search
CPC ..................... H01R 13/62938; H01R 13/6275; H01R 9/03; H01R 13/6272; H01R 13/641
USPC .................................. 439/157, 350–358, 489
See application file for complete search history.

(56) References Cited

U.S. PATENT DOCUMENTS 4,634,204 A *  1/1987  Detter et al. ................... 439/347
6,217,388 B1 *  4/2001  Francis ..................... 439/620.07

(Continued)

FOREIGN PATENT DOCUMENTS

DE    102007026261 A1    12/2008
WO      2008142490 A1    11/2008

OTHER PUBLICATIONS

International Search Report dated Aug. 2, 2012.

*Primary Examiner* — Thanh Tam Le
(74) *Attorney, Agent, or Firm* — Robert J. Myers (57) ABSTRACT

An electrical connector assembly including a first connector having a first casing and a plurality of contacts and a second connector having a second casing and a plurality of mating contacts. The first and second connectors are configured to transition between an unassembled condition and an assembled condition to connect the plurality of contacts together with the mating contacts. The second connector supports a connector position assurance (CPA) element. In the unassembled condition, the CPA element abuts against a surface borne by one of connectors, thereby preventing movement of the CPA element relative to the second connector between a safety and an active position. In the assembled condition, the CPA element does not abut against the surface and is movable relative to the second connector between the safety and active positions, so as to connect the mating contact carried by the CPA element with the corresponding contact.

16 Claims, 6 Drawing Sheets

(52) U.S. Cl.
CPC ........ B60L 11/1818 (2013.01); *B60L 2270/32* (2013.01); *B60L 2270/34* (2013.01); *Y02T 10/7005* (2013.01); *Y02T 90/14* (2013.01)

(56) References Cited

U.S. PATENT DOCUMENTS

| | | | | |
|---|---|---|---|---|
| 6,896,538 B2 * | 5/2005 | Grubbs | | 439/352 |
| 7,044,758 B2 * | 5/2006 | Deno et al. | | 439/157 |
| 7,217,150 B2 * | 5/2007 | Lekic et al. | | 439/352 |
| 7,351,089 B2 * | 4/2008 | Neale, III | | 439/352 |
| 7,438,570 B2 * | 10/2008 | Mori et al. | | 439/157 |
| 7,744,390 B2 * | 6/2010 | Tyler et al. | | 439/157 |
| 7,934,939 B2 * | 5/2011 | Chen et al. | | 439/352 |
| 8,303,320 B2 * | 11/2012 | Loncar et al. | | 439/157 |
| 8,628,344 B2 * | 1/2014 | Cole | | 439/352 |
| 8,827,729 B2 * | 9/2014 | Gunreben et al. | | 439/188 |
| 2004/0087206 A1 | 5/2004 | Grubbs | | |
| 2006/0110957 A1 | 5/2006 | Lekic et al. | | |
| 2008/0132098 A1 | 6/2008 | Tyler et al. | | |
| 2008/0182447 A1 | 7/2008 | Lutsch et al. | | |

* cited by examiner

ELECTRICAL CONNECTOR ASSEMBLY WITH A CPA ELEMENT

CROSS-REFERENCE TO RELATED APPLICATION

This application is a national stage application under 35 U.S.C. §371 of PCT Application Number PCT/EP2012/058943 having an international filing date of May 14, 2012, which designated the United States, which PCT application claimed the benefit of PCT Application Number PCT/IB2011/001455, filed May 17, 2011, the entire disclosure of each of which are hereby incorporated herein by reference.

TECHNICAL FIELD OF THE INVENTION

The present invention relates to electrical connector assemblies, in particular for power contact assemblies for electricity-fuel hybrid vehicles or fully electric vehicles.

BACKGROUND OF THE INVENTION

Recent trends in the automotive industry concern these electricity-fuel hybrid vehicles or fully electric vehicles which are powered by batteries through cables with high current and/or voltage.

Electrical batteries are used to supply the engine of these vehicles with energy, but might also be used for the electrical supply of the other electrical appliances of the vehicle.

For instance electrical connector assemblies are used to electrically connect the battery to other electrical appliances. Each of such electrical connector assemblies comprises one connector to be connected to the battery and a second connector to be connected to the electrical appliance.

For safety reasons, it is required that little or no power flows through the connectors during their mating/unmating.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

It is an object of the present invention to provide an electrical connector assembly with an electrical security system which ensures that power flows through the connectors only in the case of correct and complete connectors mating.

In accordance with one embodiment of this invention, an electrical connector assembly is provided. The electrical connector assembly includes a first connector having a first casing and a plurality of contacts and a second connector having a second casing and a plurality of mating contacts. The first and second connectors are configured to selectively mate and unmate along a mating axis respectively between an unassembled condition and an assembled condition to electrically connect the plurality of contacts of the first connector and the plurality of mating contacts of the second connector together. The second connector supports a connector position assurance (CPA) element carrying one of the mating contacts. In the unassembled condition, the CPA element abuts against an abutment surface borne by one of the first and second connector, thereby preventing movement of the CPA element relative to the second connector between a safety position and an active position. In the assembled condition, the CPA element does not abut against the abutment surface so as to be movable relative to the second connector between the safety position and the active position, so as to connect the mating contact carried by the CPA element with the corresponding contact of the first connector.

The electrical connector assembly of the present invention can comprise first and second connectors provided with more than three contacts, particularly six contacts.

With these features, the electrical connector assembly of the present invention limits the possibility of electrical arcing, thereby reducing the risk of injury to users and/or damage to the connectors and to the electrical appliances connected to the connector assembly.

In some embodiments of the invention, one might also use one or more of the features defined in the claims.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

On the different Figures, the same reference signs designate like or similar elements.

DETAILED DESCRIPTION OF THE INVENTION

Figure 1:
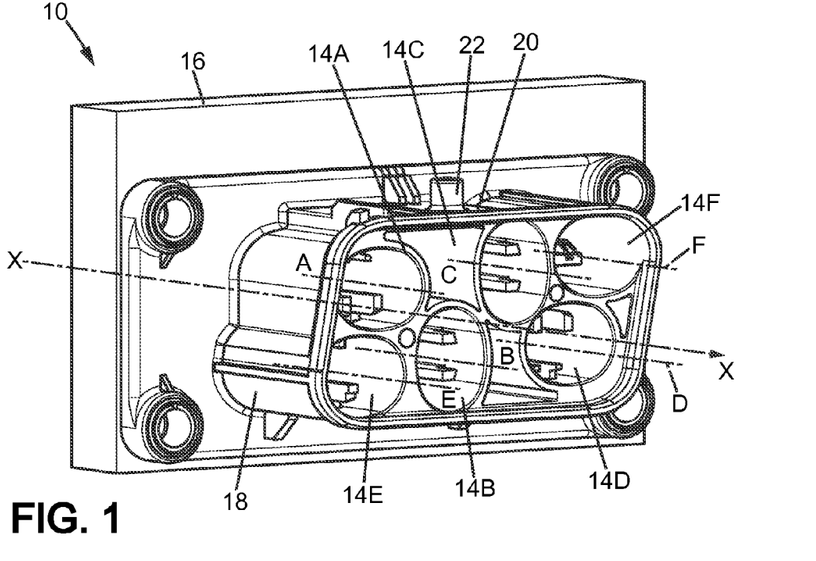
FIG. 1 is a perspective view of a first connector of a connector assembly.
Figure 2:
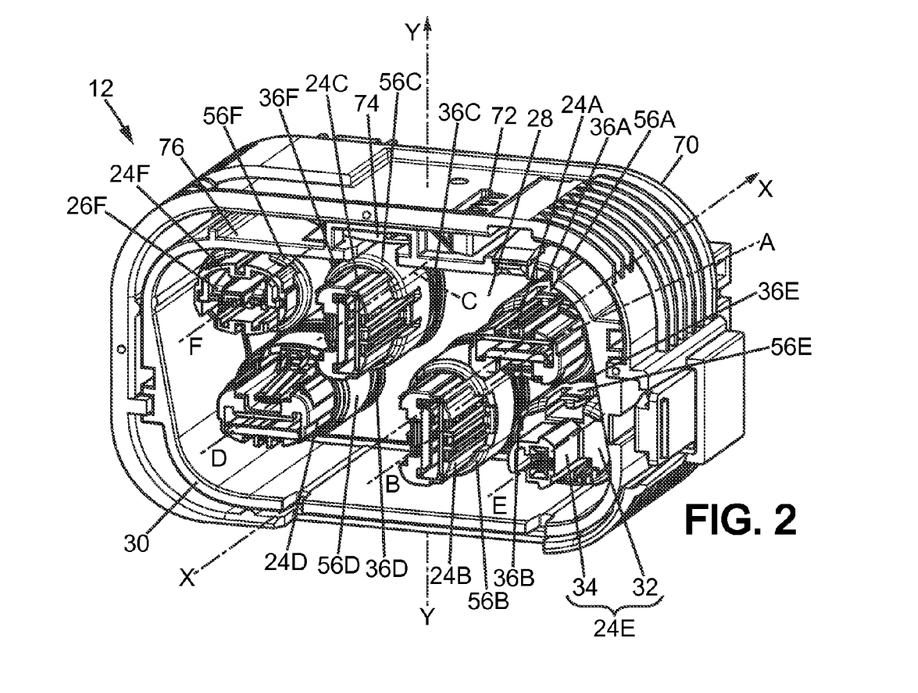
FIG. 2 is a perspective view of a second connector intended to mate with the first connector of FIG. 1.

FIG. 1 shows in details a first connector 10 to mate along a longitudinal mating axis XX with a second connector 12 illustrated on FIG. 2 such as to be mechanically and electrically connected to it and to form a connector assembly. On the different Figures, the mating axis XX is oriented from the first connector 10 toward the second connector 12. The first connector 10 of FIG. 1 comprises a first cylindrical socket 14A, a second cylindrical socket 14B, a third cylindrical socket 14C, a fourth cylindrical socket 14D, a fifth cylindrical socket 14E and a sixth cylindrical socket 14F each respectively surrounding a contact (not visible in FIG. 1).

Each cylindrical socket 14A-14F extends forward from a first casing 16 along a respective axis AA, BB, CC, DD, EE and FF each parallel to the mating axis XX. The six cylindrical sockets 14A-14F have an external shape which is identical in terms of shape and size. More precisely, the six cylindrical sockets 14A-14F have a generally oval external shape, when viewed in cross-section. In order to improve robustness of the connector, the six cylindrical sockets 14A-14F are joined one with at least an adjacent socket, along the mating axis XX. In the described embodiment, each of the three cylindrical sockets 14A, 14B, 14E is joined with the two others, the cylindrical socket 14B is also joined with the cylindrical socket 14C, and each of the three cylindrical sockets 14C, 14D, 14F is joined with the two others. The six cylindrical sockets 14A-14F are advantageously arranged relative to each other in such a manner that space can be saved, thereby providing a compact connector assembly having a reduced size. For example, as illustrated on FIG. 1, the six cylindrical sockets 14A-14F are placed side by side in a staggered way and oriented around their respective axis AA-FF parallel or perpendicular relative to each other. The two cylindrical sockets 14B and 14C are oriented around their respective axis BB and CC parallel to each other and perpendicular to the four cylindrical sockets 14A, 14D, 14E and 14F.

The contacts intended to be received in the first, second, third and fourth cylindrical sockets 14A-14D are identical power contacts. The contact intended to be received in the sixth cylindrical socket 14F is a shunt contact.

The first casing 16 is provided with a housing 18 jointly surrounding the six cylindrical sockets 14A-14F.

The housing 18 comprises a top wall 20 and a guiding pin 22 projecting outwardly from the top wall 20.

The second connector 12 of FIG. 2 comprises a first cylindrical sleeve 24A, a second cylindrical sleeve 24B, a third cylindrical sleeve 24C, a fourth cylindrical sleeve 24D, a fifth cylindrical sleeve 24E and a sixth cylindrical sleeve 24F respectively surrounding a mating contact (only the mating contact 26F is visible in FIG. 2). Each cylindrical sleeve 24A-24F extends frontward from a transversal wall 28 provided on a second casing 30 respectively along the axis AA, BB, CC, DD, EE and FF of the cylindrical sockets 14A-14F of the first connector 10. The first, second, third, fourth and sixth cylindrical sleeves 24A-24D and 24F have an external shape which is identical in terms of shape and size. More precisely, the five cylindrical sleeves 24A-24D and 24F have a generally oval external shape, when viewed in cross-section. The fifth cylindrical sleeve 24E is slightly different from the other cylindrical sleeves 24A-24D and 24F. The fifth cylindrical sleeve 24E comprises a rear portion 32 and a front portion 34 extending frontward from the rear portion 32. The rear portion 32 has an external shape identical in terms of shape and size to the external shape of the cylindrical sleeves 24A-24D and 24F, whereas the front portion 34 has a smaller and rather circular external shape. The first, second, third, fourth, fifth and sixth cylindrical sleeves 24A-24F are arranged in order to cooperate respectively with the first, second, third, fourth, fifth and sixth cylindrical sockets 14A-14F.

The mating contacts intended to be received in the first, second, third and fourth cylindrical sleeves 24A-24D are identical power contacts intended to be connected respectively to the power contacts of the first connector 10. The mating contact intended to be received in the fifth cylindrical sleeve 24E is intended to be connected to the contact received in socket 14E of the first connector 10. The mating contact 26F received in the sixth cylindrical sleeve 24F is a mating shunt contact intended to be connected to the shunt contact received in socket 14F of the first connector 10.

The connector assembly thus comprises six pairs of contacts and mating contacts, four of which being power contact pairs and one of which being a shunt contact pair. The four power contact pairs are configured to transmit powers in the range of e.g. 5 kW to 30 kW, for instance to power an engine of an automotive vehicle by a power supply such as a battery. The shunt contact pair is configured to selectively enable/disable the flow of power through the connector assembly, as described later. For this purpose, the shunt contact of the first connector 10 comprises two electrical terminals intended to be connected e.g. to an electrically controllable power switch of the battery. The connection of the two terminals of the first connector 10 by the mating shunt contact 26F of the second connector 12, e.g. a shorting clip, is intended to close the power switch and thereby activate the battery whereas the disconnection of the two terminals is intended to open the power switch and thereby deactivate the battery.

In order to avoid any risk of contacting the contacts or mating contacts with one finger when a user mates the first and second connectors 10, 12 together, each of the cylindrical sockets 14A-14F and each of the cylindrical sleeves 24A-24F surrounding the corresponding contact complies with the standard UT2X. Each cylindrical socket 14A-14F is configured to receive the corresponding cylindrical sleeve 24A-24F internally in surrounding it when the first and second connectors 10, 12 mate together along the mating axis XX.

In order to avoid any risk of error when connecting the first and second connectors 10, 12 together, the cylindrical sockets 14A-14F are able to receive the corresponding cylindrical sleeves 24A-24F in one position only.

In order to provide a sealing between the two connectors 10, 12 when mating, the second casing 30 is provided with a first, a second, a third, a fourth, a fifth and a sixth sealing element 36A-36F. The first sealing element 36A surrounds a portion of the first cylindrical sleeve 24A to provide sealing between the first cylindrical socket 14A and the first cylindrical sleeve 24A when the first and second connectors 10, 12 mate. The second sealing element 36B surrounds a portion of the second cylindrical sleeve 24B to provide sealing between the second cylindrical socket 14B and the second cylindrical sleeve 24B when the first and second connectors 10, 12 mate. The above-described arrangement is applicable to the third, fourth, fifth and sixth sealing elements 36C-36F. The first, second, third, fourth, fifth and sixth sealing elements 36A-36F are formed as separate and identical pieces. The sealing elements 36A-36F are preferably made from silicone.

Figure 3:
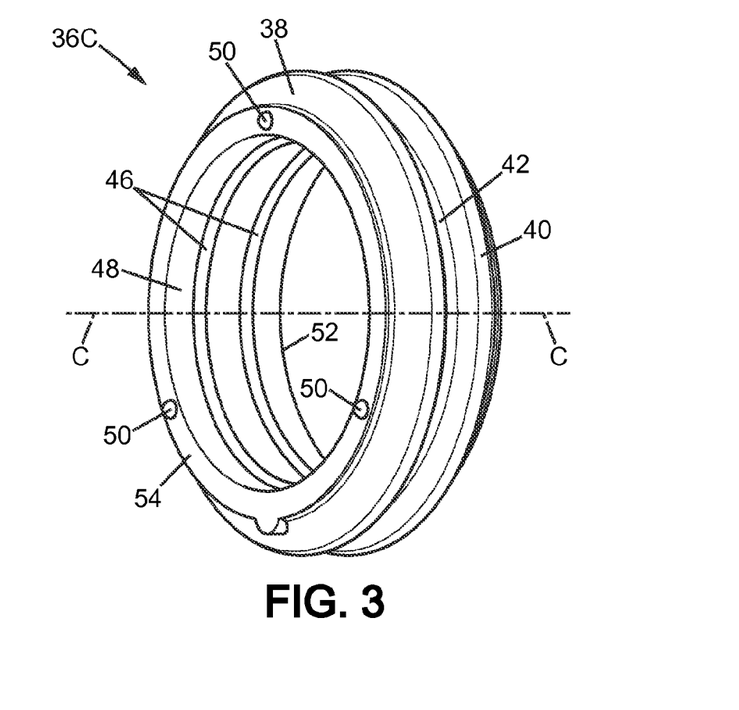
FIG. 3 is a perspective view of a sealing system of the second connector of FIG. 2.

As best seen on FIG. 3, the sealing element 36A-36F is a closed ring having a generally oval shape when it is stretched over the receiving sleeve. The sealing element 36A-36F comprises an external surface 38 provided with a front cylindrical bulging 40 and a rear cylindrical bulging 42 configured to interfere and to be compressed against the internal surface 44 of the corresponding cylindrical socket 14A-14F when the first and second connectors 10, 12 mate (see FIG. 5). The sealing element 36A-36F further comprises two annular ribs 46 protruding internally from an internal surface 48, thereby increasing friction between the sealing element 36A-36F and the corresponding cylindrical sleeve 24A-24F to reduce the risk that the sealing element 36A-36F moves axially along the corresponding cylindrical sleeve 24A-24F. The sealing element 36A-36F further comprises three protrusions 50 protruding from a rear axial surface 52 and an opposite front axial surface 54, thereby increasing friction between the sealing element 36A-36F and respectively the corresponding cylindrical sleeve 24A-24F and a corresponding retaining member (described later) to reduce the risk that the sealing element 36A-36F rotates around the corresponding axis AA-FF. The three protrusions 50 are evenly distributed on the axial surfaces 52, 54 around the respective axis AA-FF.

In order to secure the sealing elements 36A-36F onto the second connector 12, the second casing 30 is provided with a first, a second, a third, a fourth, a fifth and a sixth retaining member 56A-56F (FIG. 2). The retaining member 56A-56F surrounds the cylindrical sleeve 24A-24F and is configured as a stop member to retain the sealing element 36A-36F onto the cylindrical sleeve 24A-24F. The first, second, third, fourth, fifth and sixth retaining members 56A-56F are formed as separate and identical pieces.

Figure 4:
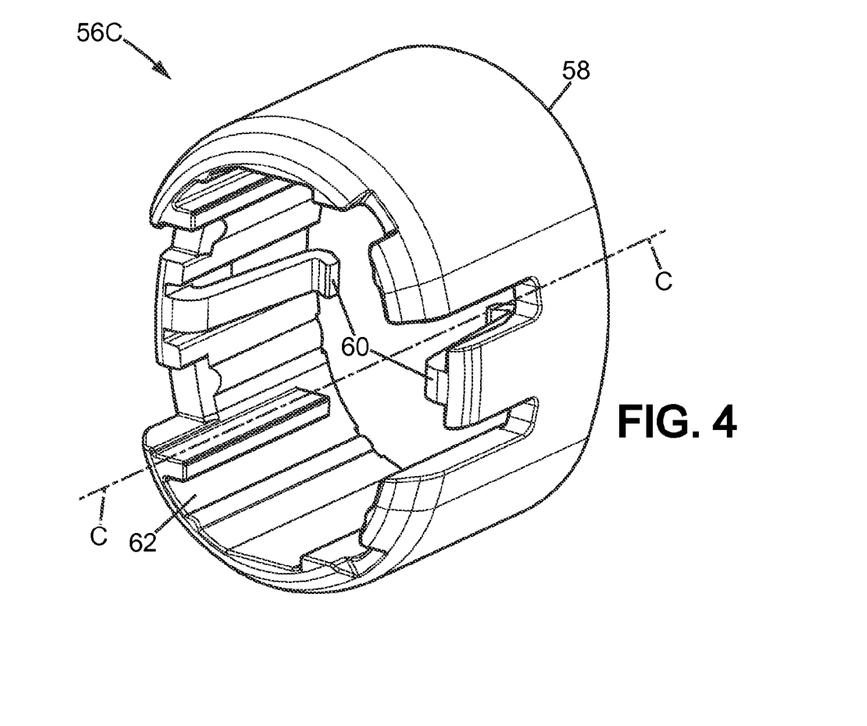
FIG. 4 is a perspective view of a retaining member of the sealing system of FIG. 3.

As best seen on FIG. 4, the retaining member 56A-56F comprises a cylindrical collar having a generally oval shape. The retaining member 56A-56F further comprises a rear axial surface 58 intended to be in contact with the front axial surface 54 of the corresponding sealing element 36A-36F when the retaining member 56A-56F and the corresponding sealing element 36A-36F are mounted on the corresponding cylindrical sleeve 24A-24F. The retaining member 56A-56F comprises two opposite and identical retaining lugs 60 protruding from an internal surface 62 and designed to cooperate with the corresponding cylindrical sleeve 24A-24F to secure the retaining member 56A-56F onto the corresponding cylindrical sleeve 24A-24F. Each retaining member 56A-56F is made from plastic material.

Figure 5:
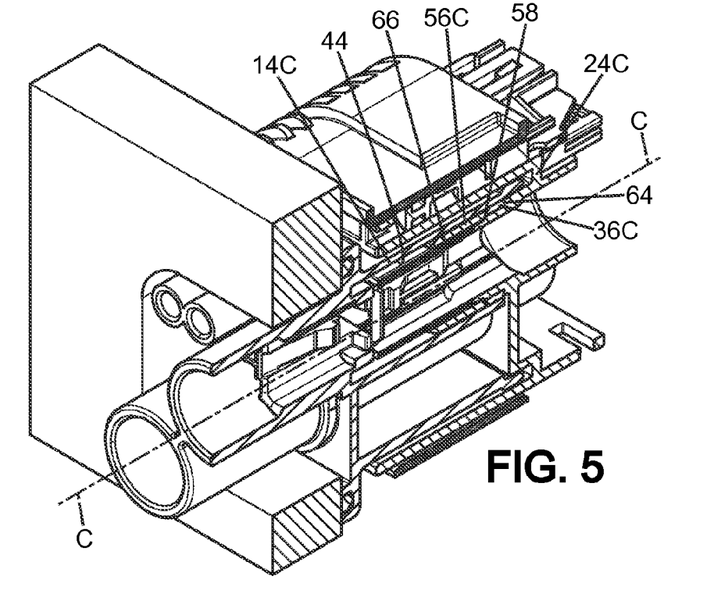
FIG. 5 is a longitudinal and vertical cross-sectional view of the connector assembly obtained after mating the first connector of FIG. 1 with the second connector of FIG. 2.
Figure 6:
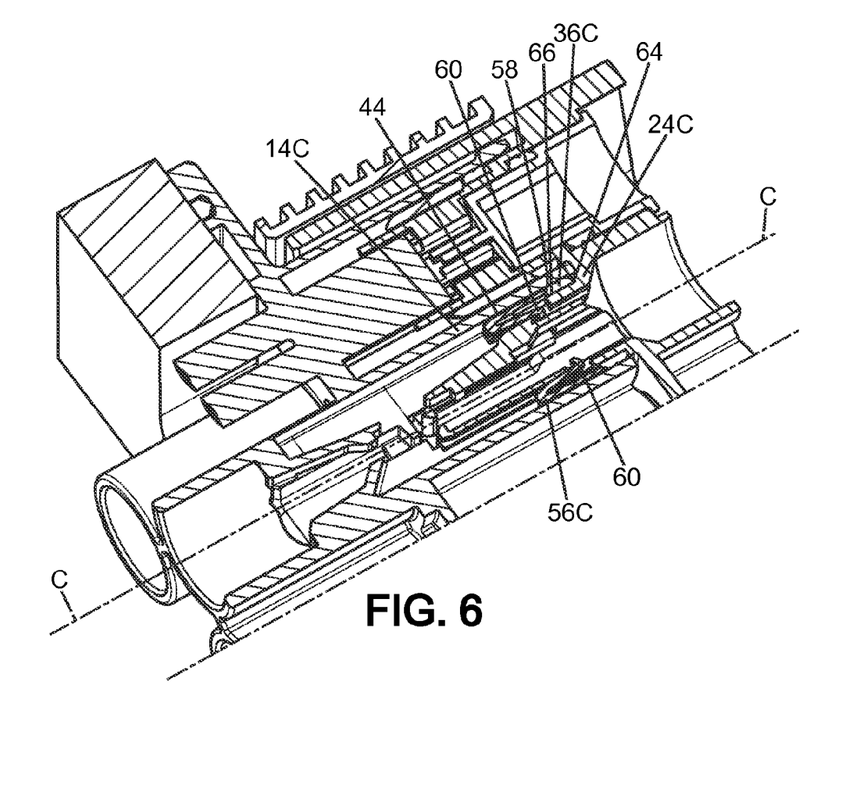
FIG. 6 is a longitudinal and horizontal cross-sectional view of the connector assembly obtained after mating the first connector of FIG. 1 with the second connector of FIG. 2.

As illustrated on FIGS. 5 and 6, each sealing element 36A-36F is sandwiched axially between the rear axial surface 58 of the corresponding retaining member 56A-56F and an external shoulder 64 provided on the corresponding cylindrical sleeve 24A-24F, thereby being secured onto the second connector 12. Each sealing element 36A-36F is also sandwiched radially between an external surface 66 of the corresponding cylindrical sleeve 24A-24F and the internal surface 44 of the corresponding cylindrical socket 14A-14F when the first and second connectors 10, 12 mate, thereby forming a radial compression seal with regard to the respective axis AA-FF. Accordingly, when the first and second connectors 10, 12 mate, the sealing elements 36A-36F reduce the risk of water, moisture and/or dust contamination in the connectors. More precisely, each sealing element 36A-36F seals the corresponding contact pair, each of these contact pairs being also sealed independently from the others. Besides, since the sealing elements 36A-36F and the retaining members 56A-56F are pieces independent of the type of contact used, the connector assembly is simple to produce and has a reduced manufacturing cost.

The electrical connector assembly is also provided with an electrical security system which guarantees that power flows through the connectors only in the case of correct and complete connectors mating. It is also provided with a mating assistance system which, in the present embodiment, cooperates with the electrical security system. However, in variants, the electrical connector assembly may not comprise a mating assistance system, or may comprise a security system not cooperating with the mating assistance system.

Referring back to FIG. 2, the second connector 12 comprises a slider 70 having a tubular shape along the mating axis XX. The slider 70 is slidingly mounted on the second casing 30 and comprises a longitudinal rack of teeth 72 extending parallel to the mating axis XX. The second connector 12 comprises a cam gear 74 mounted on an upper wall 76 of the second casing 30. The cam gear 74 is rotatably mounted with respect to the upper wall 76 around an axis YY perpendicular to the mating axis XX.

Figure 7:
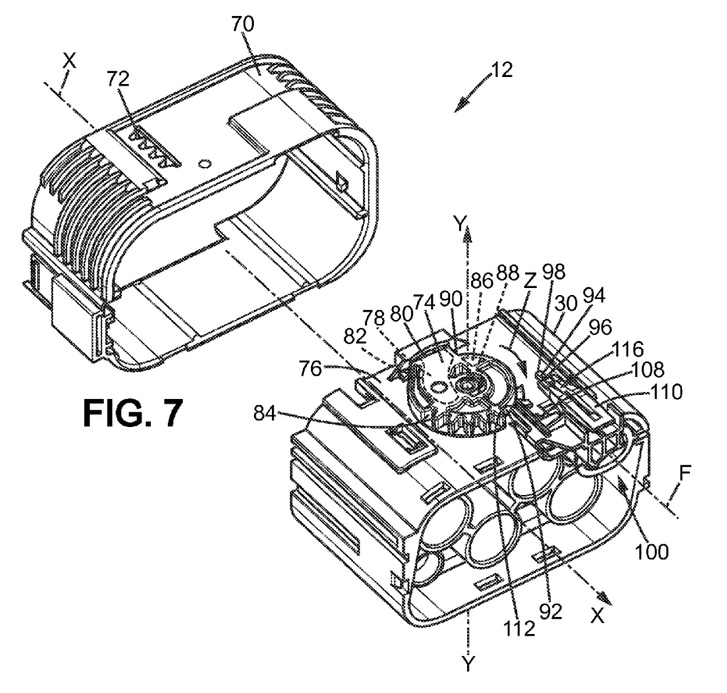
FIG. 7 is an exploded perspective view of the second connector of FIG. 2 in a first configuration.

As best seen on FIG. 7, the cam gear 74 comprises a guiding groove 78 for receiving and driving the guiding pin 22 of the first connector 10 (see FIG. 1). The guiding groove 78 has substantially a circular shape around an axis parallel to and offset from the axis YY. The guiding groove 78 comprises an entrance aperture 80 for receiving the guiding pin 22 of the first connector 10 and a side wall 82 delimitating the outer periphery of the guiding groove 78. The cam gear 74 comprises a gear section 84 with teeth extending circularly around the axis YY. The teeth of the gear section 84 are configured to intermesh with the longitudinal rack of teeth 72 of the slider 70. The cam gear 74 further comprises a chamber 86 which radially opens on the periphery of the cam gear 74. The chamber 86 is delimitated on one side by a blocking wall 88 and on the other side by a wall 90 shared with the guiding groove 78. The cam gear 74 comprises a peripheral abutment surface 92 located between the gear section 84 and the chamber 86, opposite the guiding groove 78. The second casing 30 comprises a locking tooth 94 projecting from the upper wall 76 and having a front ramp 96 and a rear wall 98. The second connector 12 further comprises a CPA (Connector Position Assurance) element 100 mountable on the upper wall 76 of the second casing 30.

Figure 8:
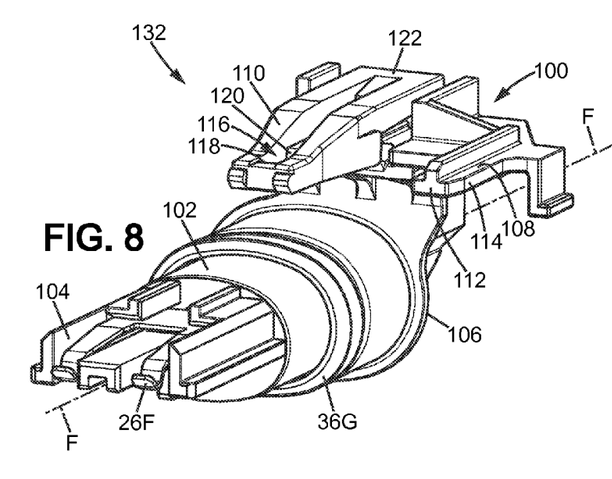
FIG. 8 is a perspective view of a CPA element of the second connector of FIG. 2.

Referring to FIG. 8, the CPA element 100 comprises a cylindrical body 102 having a generally oval external shape to be received inside the sixth cylindrical sleeve 24F. A support part 104, extending forward from the cylindrical body 102, carries the mating shunt contact 26F which is a shorting clip having a generally U-shape. The CPA element 100 comprises a linkage part 106 linking the cylindrical body 102 to a blocking arm 108 and a locking lever 110. The blocking arm 108 comprises a front face 112 and a lateral face 114, and is sized and shaped to be received in the chamber 86 of the cam gear 74. The locking lever 110 comprises a locking hole 116 delimitated by a front end wall 118 and a rear ramp 120. The locking hole 116 is sized and shaped to engage with the locking tooth 94 of the second casing 30. The locking lever 110 further comprises an actuation surface 122 configured to be pushed, e.g. by a finger of a user, along a direction parallel to the axis YY, in order to release the locking lever 110 from engagement with the locking tooth 94.

The CPA element 100 is formed as one piece, the cylindrical body 102, the support part 104, the linkage part 106, the blocking arm 108 and the locking lever 110 being integral with each other. Thus, the CPA element 100 is simple to produce and has a reduced manufacturing cost.

A seventh sealing element 36G is provided on the CPA element 100 and surrounds the cylindrical body 102 to provide sealing between the CPA element 100 and the sixth cylindrical sleeve 24F as explained below. The seventh sealing element 36G is identical in shape and material to the other six sealing elements 36A-36F but has a slightly smaller size.

The CPA element 100 is mounted on the upper wall 76. When the first and second connectors 10, 12 are correctly and completely mated, the CPA element 100 is slidingly movable with respect to the upper wall 76 along the axis FF parallel to the mating axis XX between a safety position and an active position in which the mating shunt contact 26F carried by the CPA element 100 is connected to the corresponding shunt contact of the first connector 10. The safety and active positions of the CPA element 100 are described in relation with the mating movement of the first and second connectors 10, 12. Initially, the first and second connectors 10, 12 are unmated. The slider 70 is mounted on the second casing 30 such that the longitudinal rack of teeth 72 engages with the gear section 84 of the cam gear 74 and the entrance aperture 80 of the guiding groove 78 extends forwardly towards the mating interface of the second connector 12.

In this first initial configuration corresponding to an unassembled condition of the first and second connectors 10, 12, the CPA element is in its safety position (FIG. 7) with the front face 112 of the blocking arm 108 abutting against the abutment surface 92 of the cam gear 74 and thereby preventing engagement of the locking lever 110 with the locking tooth 94 of the second casing 30. The first and second connectors 10, 12 are then aligned along the mating axis XX and brought closer to each other until the guiding pin 22 of the first connector 10 enters the guiding groove 78 of the cam gear 74 through the entrance aperture 80. The slider 70 is then moved forward along the mating direction, this causes the rack of teeth 72 to rotate the cam gear 74 via the intermesh of the teeth. As the cam gear 74 rotates, it cams the guiding pin 22 to move along the guiding groove 78 so as to help move the second connector towards the first connector into final mated position. During this rotation movement, the CPA element 100 is still prevented from moving forward due to the abutment of the front face 112 against the abutment surface 92 of the cam gear 74. The rotation movement of the cam gear 74 stops when the guiding pin 22 meets the end of the guiding groove 78. Thus, the abutment surface 92 has been driven away from engagement with the CPA element 100 by the mating of the first and second connectors 10, 12.

In this intermediate configuration corresponding to an assembled condition of the first and second connectors 10, 12, all the contacts of the first connector 10 are connected to the respective mating contacts of the second connector 12 except for the shunt contact pair whose mating shunt contact 26F is carried by the CPA element 100. Indeed the CPA element 100 is still in its safety position but with its front face 112 which is released from the abutment surface 92 and now faces the chamber 86. Thus, the power switch of the battery is still open and power cannot flow through the other contact pairs.

Figure 9:
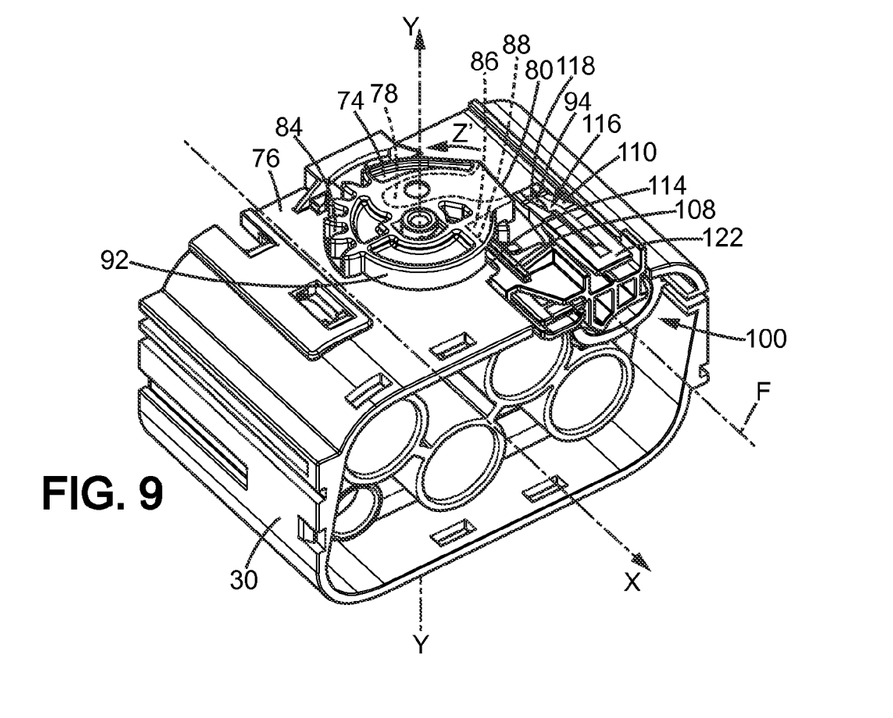
FIG. 9 is a perspective view of a part of the second connector of FIG. 2 in a second configuration.

Next, as the CPA element 100 is moved forwardly, the blocking arm 108 enters the chamber 86 and the locking lever 110 rides on the front ramp 96 of the locking tooth 94 until the locking tooth 94 engages the locking hole 116. The CPA element 100 finally reaches its active position (FIG. 9) in which the mating shunt contact 26F of the second connector 12 is connected to the corresponding shunt contact of the first connector 10. Thus, in the active position, the power switch of the battery is closed and power can flow through the other contact pairs.

In the active position, the CPA element 100 is further configured to block the rotation of the cam gear 74 in the direction of arrow Z', opposite to the direction of arrow Z, via the abutment of the lateral face 114 of the blocking arm 108 against the blocking wall 88 of the chamber 86, and thereby impeding the slider 70 from sliding rearward. Accordingly, the CPA element 100 further has the function of interlocking the first and second connectors 10, 12 to each other. Thus, it is impossible to disconnect the first and the second connectors as long as the CPA element 100 is in its active position, i.e. as long as the power switch of the battery is closed, i.e. as long as power flows through the connector assembly.

To unmate the first connector 10 from the second connector 12, the actuation surface 122 of the CPA element 100 is pushed along the axis YY so as to disengage the locking tooth 94 from the locking hole 116.

Next, the CPA element 100 is slid rearwardly, thereby releasing the cam gear 74 from the blocking arm 108 and at the same time disconnecting the shunt contact pair. When the CPA element 100 meets its safety position, the connector assembly is in a configuration wherein, except for the shunt contact pair, all the other contacts of the first connector 10 are still connected to the respective mating contacts of the second connector 12 but power cannot flow through them anymore. The slider 70 is then moved rearward and the first connector 10 is moved away from the second connector 12. Thus, the connector assembly and the CPA element are configured in such a way that the contact pairs can be disconnected only after the CPA element 100 has returned to its safety position, i.e. only after the power switch of the battery has been opened, i.e. only after power no longer flows through the connector assembly.

So, the connector assembly is provided with an improved connection process in terms of safety, the electrical security system limiting the possibility of electrical arcing, thereby reducing the risk of injury to users and/or damage to the connectors and to the electrical appliances connected to the connector assembly.

The CPA element 100 also serves as a visual checking means to determine the correct and complete mating of the first and second connectors 10, 12. Indeed, the CPA element 100 being visible from the outside of the connector assembly, it can be visually distinguished if the CPA element 100 is in its active or safety position. With this function, a user can easily judge the state of the connection by simply looking at the CPA element 100.

Figure 10:
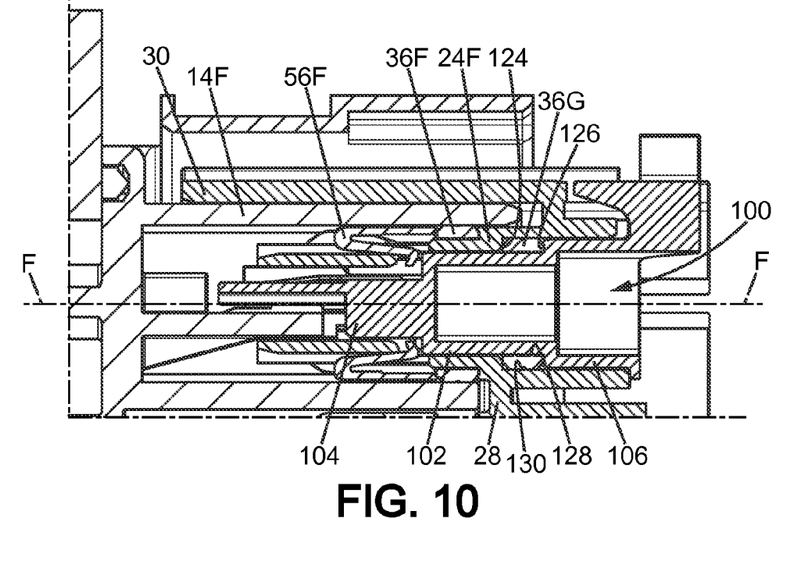
FIG. 10 is a longitudinal and vertical cross-sectional view of the CPA element of FIG. 8 in an active position corresponding to the second configuration of the second connector shown on FIG. 9.
Figure 11:
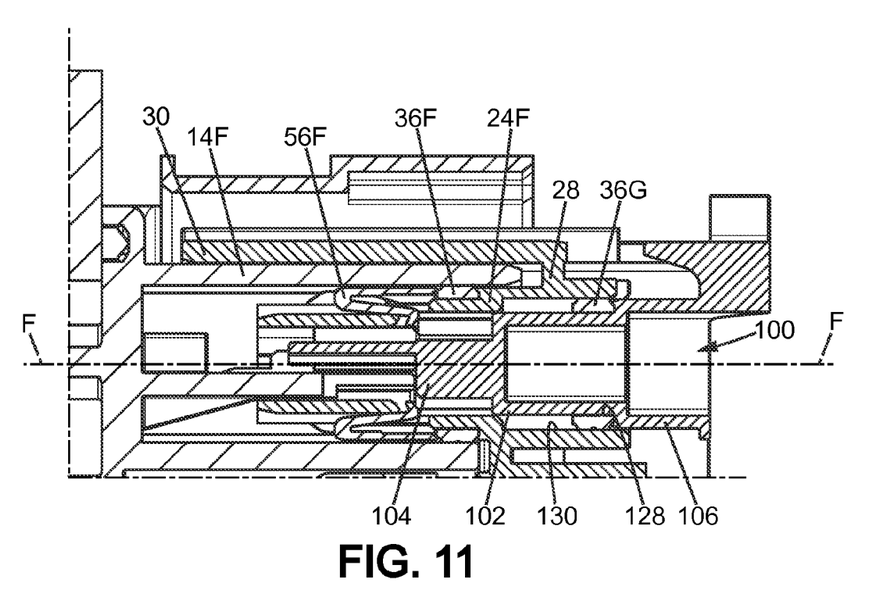
FIG. 11 is a view similar to that of FIG. 10 showing the CPA element in a safety position corresponding to the first configuration illustrated on FIG. 7.

As can be seen from FIGS. 10 and 11, the seventh sealing element 36G surrounds the cylindrical body 102 of the CPA element 100 to seal the CPA element 100 in its active position (FIG. 10) as well as in its safety position (FIG. 11). Indeed, referring to FIG. 10, when the CPA element 100 is in its active position, the seventh sealing element 36G is sandwiched axially between an internal shoulder 124 provided on the corresponding cylindrical sleeve 24F which extends forward beyond the transversal wall 28 of the second casing 30, and an external shoulder 126 provided on the CPA element 100 at the junction between the cylindrical body 102 and the linkage part 106.

The seventh sealing element 36G is also sandwiched radially between an external surface 128 of the cylindrical body 102 of the CPA element 100 and an internal surface 130 of the corresponding cylindrical sleeve 24F, thereby forming a radial compression seal with regard to the respective axis FF.

Similarly, referring to FIG. 11, when the CPA element 100 is in its safety position, the seventh sealing element 36G is sandwiched radially between the external surface 128 of the cylindrical body 102 of the CPA element 100 and the internal surface 130 of the corresponding cylindrical sleeve 24F, thereby forming a radial compression seal with regard to the respective axis FF. Accordingly, when the first and second connectors 10, 12 mate, the seventh sealing element 36G participates in reducing the risk of water, moisture and/or dust contamination in the connectors by sealing the CPA element 100.

The CPA element 100, the mating shunt contact 26F and the sealing element 36G thus form a third electrical connector 132 (FIG. 8) which is integrated in and interacts with the second connector 12 and is configured to further connect with a first complementary connector.

Connector assemblies having another number of contacts, the contacts being of the same or of different types are also part of the invention. These connector assemblies are represented in relation to a special application (i.e. vehicles), but they could be used in other applications.

In the embodiment illustrated, the connector assembly comprises a first connector 10 and a second connector 12 intended to mate with the first one.

Figure 12:
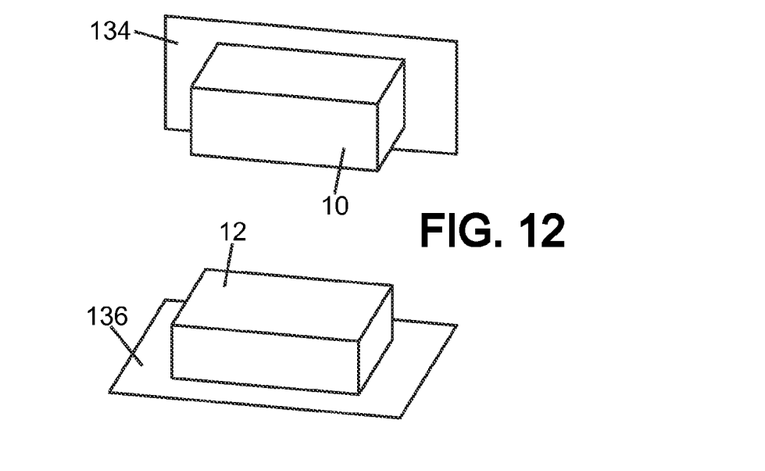
FIG. 12 is a schematic view of a system comprising the connector assembly before mating the first connector of FIG. 1 with the second connector of FIG. 2.

As illustrated schematically on FIG. 12 depicting a system, the first connector 10 may for example be carried by a power supply, more precisely a battery 134, whereas the second connector 12 may be carried by a base 136 of an automotive vehicle While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

The invention claimed is:

1. An electrical connector assembly, comprising:
a first connector having a first casing, a first contact, and a second contact, and
a second connector having a second casing, a first mating contact and a second mating contact in which the first and second connectors are configured to selectively mate and unmate along a mating axis respectively between an unassembled condition and an assembled condition to electrically connect the first contact and the first mating contact together and the second contact and the second mating contact together,
wherein the second connector supports a connector position assurance (CPA) element carrying the second mating contact,
wherein, in the unassembled condition, the CPA element abuts against an abutment surface borne by one of the first and second connector, thereby preventing movement of the CPA element relative to the second connector between a safety position and an active position,
wherein, in the assembled condition, the CPA element does not abut against said abutment surface so as to be movable relative to the second connector between said safety position and said active position, so as to connect the second mating contact carried by the CPA element with the corresponding second contact of the first connector, and
wherein a sealing system is provided to surround the CPA element to provide sealing of the CPA element in the active position as well as in the safety position.

2. The electrical connector assembly according to claim 1, wherein the sealing system of the CPA element comprises a radial compression seal with regard to the mating axis.

3. The electrical connector assembly according to claim 1, wherein the sealing system of the CPA element is sandwiched between an external surface of the CPA element and an internal surface of the second casing.

4. The electrical connector assembly according to claim 1, wherein the sealing system of the CPA element is a closed ring made from silicone material.

5. The electrical connector assembly according to claim 1, wherein the second connector is provided with another sealing system to provide sealing of the second mating contact carried by the CPA element and the corresponding second contact of the first connector when the first and second connectors mate.

6. The electrical connector assembly according claim 1, wherein the first contact is different from the second contact and the first mating contact is different from the second mating contact.

7. The electrical connector assembly according to claim 6, wherein the second contact of the first connector and the second mating contact of the second connector are both shunt contacts.

8. The electrical connector assembly according claim 1, wherein the abutment surface-is driven away from engagement with the CPA element by the mating of the first and second connectors.

9. A system comprising:
a power supply having at least two power outputs;
a base; and
a connector assembly according to claim 1, wherein the first connector is mounted on the power supply, with the first and second contacts connected to the power outputs, and wherein the second connector is mounted on the base.

10. An electrical connector assembly, comprising:
a first connector having a first casing, a first contact, and a second contact, and
a second connector having a second casing, a first mating contact and a second mating contact in which the first and second connectors are configured to selectively mate and unmate along a mating axis respectively between an unassembled condition and an assembled condition to electrically connect the first contact and the first mating contact together and the second contact and the second mating contact together,
wherein the second connector supports a connector position assurance (CPA) element carrying the second mating contact,
wherein, in the unassembled condition, the CPA element abuts against an abutment surface borne by one of the first and second connector, thereby preventing movement of the CPA element relative to the second connector between a safety position and an active position,
wherein, in the assembled condition, the CPA element does not abut against said abutment surface so as to be movable relative to the second connector between said safety position and said active position, so as to connect the second mating contact carried by the CPA element with the corresponding second contact of the first connector, and
wherein the abutment surface is delimitated by a cam gear rotatably mounted on the second casing according to an axis perpendicular to the mating axis.

11. The electrical connector assembly according to claim 10, wherein the abutment surface is borne by the second connector.

12. The electrical connector assembly according claim 10, wherein the CPA element comprises a blocking arm which, in the active position of the CPA element, interlocks the first and second connectors to each other.

13. The electrical connector assembly according claim 10, wherein the CPA element comprises a locking lever which locks the CPA element in its the active position.

14. The electrical connector assembly according claim 10, wherein the CPA element is formed as one piece.

15. The electrical connector assembly according claim 10, wherein the first contact is different from the second contact and the first mating contact is different from the second mating contact.

16. The electrical connector assembly according to claim 15, wherein the second contact of the first connector and the second mating contact of the second connector are both shunt contacts.

\* \* \* \* \*